(12) United States Patent
Southwell

(10) Patent No.: US 12,736,727 B1
(45) Date of Patent: Sep. 15, 2026

(54) NARROWBAND ABSORBING AND REFLECTING OPTICAL FILTERS

(71) Applicant: William H Southwell, Thousand Oaks, CA (US)

(72) Inventor: William H Southwell, Thousand Oaks, CA (US)

( * ) Notice: Subject to any disclaimer, the term of this patent is extended or adjusted under 35 U.S.C. 154(b) by 0 days.

(21) Appl. No.: 18/332,272

(22) Filed: Jun. 9, 2023

(51) Int. Cl.
*G02B 5/22* (2006.01)
*G02B 5/28* (2006.01)

(52) U.S. Cl.
CPC .............. *G02B 5/285* (2013.01); *G02B 5/22* (2013.01)

(58) Field of Classification Search
CPC .......... G02B 5/22; G02B 5/206; G02F 1/3515
USPC ................................ 359/359, 584, 585, 586
See application file for complete search history.

(56) References Cited

U.S. PATENT DOCUMENTS 5,049,780 A * 9/1991 Dobrowolski ..... H10K 59/8791 313/506
2010/0182678 A1* 7/2010 Southwell ................ G02B 5/22 359/359

OTHER PUBLICATIONS

Southwell, William H. "Cavity-like filters with absorbing layers," Applied Optics 62, No. 7, Mar. 1, 2023: B178-B181.

* cited by examiner

*Primary Examiner* — Audrey Y Chang

(57) ABSTRACT

This invention consists of two new types of narrowband optical interference filters that expand the current state-of-the-art narrowband filtering. Prior narrowband filters have a high transmission for a narrow wavelength band and reflect light from surrounding wavelengths. The filters of this invention allow for narrowband absorption and narrowband reflection. These new filters include a thin absorbing layer with the standard dielectric layers.

2 Claims, 3 Drawing Sheets

NARROWBAND ABSORBING AND REFLECTING OPTICAL FILTERS

CROSS REFERENCE TO RELATED APPLICATIONS

None

TECHNICAL FIELD OF THE INVENTION

The present invention relates to optical filters, specifically optical interference filters. In particular, the present invention relates to filters that pass light from only a narrow wavelength band and reject light from nearby wavelengths. The field of use relates to light propagation, such as in imaging in specific wavelength bands (colors) and in laser communications where light from other than the laser wavelength needs to be blocked to improve the signal-to-noise ratio. When a light detector is sensitive to a wide range of wavelengths but the signal of interest is only in a narrow wavelength band, a narrowband filter is used to reject light from the unwanted wavelengths. Light from these unwanted wavelengths acts like noise to the detector. Thus, a narrowband optical filter increases the signal-to-noise ratio.

BACKGROUND

Optical interference filters select light from specified wavelengths or angles of incidence. A second use is to enhance the transparency of optical windows, called antireflection coatings. Optical interference filters or coatings consist of multiple thin-films of alternating high and low refractive index materials. They are called interference filters because they are based on two physics principles. The first is that when an incident light beam encounters a surface, it separates into two beams: a transmitted beam and a reflected beam. The second principle is that light is a wave and can interfere with other light waves producing a resultant beam that is either stronger or weaker depending on the phase of the interfering beams. An incident light beam encountering a stack of alternating high and low refractive index materials will split up into thousands or millions of beams caused by the multiple reflections from all the surfaces. These beams add (or interfere) to produce a single output or reflected beam. The optical filter designer adjusts the phases of these multiple beams by adjusting the layer thicknesses to produce the desired spectral output. Some examples of optical interference coatings include wideband reflectors, edge or cutoff filters, wide-angle antireflection coatings, and narrowband transmission filters.

The above background information is well-known to those in the field of optical interference coatings. A popular reference book for optical thin-filter theory is H. A. Macleod, *Thin-Film Optical Filters*, Fifth Edition, CRC Press Taylor & Francis Group, Boca Raton, Florida, 2018.

Thin optical films are deposited on the optical surfaces in vacuum chambers, which also provide control for the layer thicknesses. Methods of deposition are also described in the Macleod book mentioned. Thin-film deposition is a well-developed technology, so I will not detail further the specifics of what is common knowledge to those working in the field. Instead, I will describe those features of my inventions that are new and different from the prior art. This description is directed to those working in the field. I will also indicate where my inventions will be useful. The differences from prior art occur in the design or structure of the multilayer coating and not in how it is made. The filters of my invention are made according to the current practice of optical interference coating fabrication, which practices are well-known to those practitioners of optical thin-film technology and are not elaborated on in this specification.

BRIEF SUMMARY OF THE INVENTION

I have invented two new narrowband filters. Whereas the current technology includes a narrowband pass filter that transmits light from the specified narrowband wavelengths and reflects light from the surrounding wavelengths, I have discovered a narrowband absorption filter that absorbs light from the specified narrowband wavelengths and reflects light from the surrounding wavelengths. I have also found a narrowband reflector that reflects light from the specified wavelengths and absorbs light from the surrounding wavelengths. These features are achieved by adding a thin layer of an absorbing material into the stack of alternating high and low refractive index materials.

I have described the theory of these filters and present some example coating embodiments in the paper: William H. Southwell, "Cavity-like filters with absorbing layers," Appl. Opt. 62, B178-B181 (2023). Instead of repeating information in this Applied Optics paper, I incorporate the content of that peer-reviewed paper by reference in this specification. The information in that reference is to be treated as part of the text of this application.

A novel aspect of this invention is the introduction of absorbing materials into the multilayer coating. This is counter-intuitive to the prior art because material absorption generally decreases the throughput of a filter. However, the use of very thin absorbing layers, say of the order of 10 nanometers thicknesses, and the judicious positioning of the absorbing layer in the stack produces two new filter types.

One is the narrowband absorbing filter, a wide band high reflecting filter except for a narrowband region nearly 100% absorbed. This filter could protect an optical sensor from a laser beam when applied in a reflection mode. This is a notch filter, which absorbs the laser light from a wide spectral beam. The reflected light is the signal, except for the light at the laser wavelength that is blocked. A prior art notch filter is a rugate filter as described in: R. Sargent, et al., "Advances in Precision Optical Coatings Through the Use of a Fast-Cycle Sputter Coater," *Society of Vacuum Coaters 51st Annual Technical Conference Proceedings*, Chicago, IL, Apr. 19-24, 2008. See p. 483 for reference to "notch filters." The advantages of the narrowband absorbing filter of this invention over the rugate filter are: 1. Light from this potentially bright laser is absorbed, whereas the bright laser light on a rugate filter could be scattered and eventually wind up as noise in the sensor. 2. For similar filter bandwidths and optical densities, the rugate filter is orders of magnitude thicker, making them much more expensive. 3. Besides being much thicker, the rugate filter designs are sensitive to deposition thickness errors resulting in low yields.

The narrowband absorption filter is a new class of optical interference filters for which there is no prior art. Only this invention's narrowband absorption optical interference filter can absorb a narrowband region while reflecting a wideband wavelength region.

The other new filter type is a narrowband reflector which operates in an absorbing background. For example, in an optical communications application, the objective is to isolate the laser light from all other wavelengths of light. This filter is also used in reflection mode. This filter improves the signal-to-noise ratio but also has the advantage of absorbing light from other wavelengths. This prevents such unwanted light from further scattering, which could degrade the signal-to-noise ratio. This filter is a wideband absorber except for a reflected narrowband region. There is also no prior art optical interference filter with this feature. Those familiar with optical interference filters will recognize other uses for wideband absorption, such as solar harvesting.

It is remarkable that both these new types of filters are achieved with the addition of a thin absorbing layer (or layers).

DETAILED DESCRIPTION OF THE INVENTION

Figure 1:
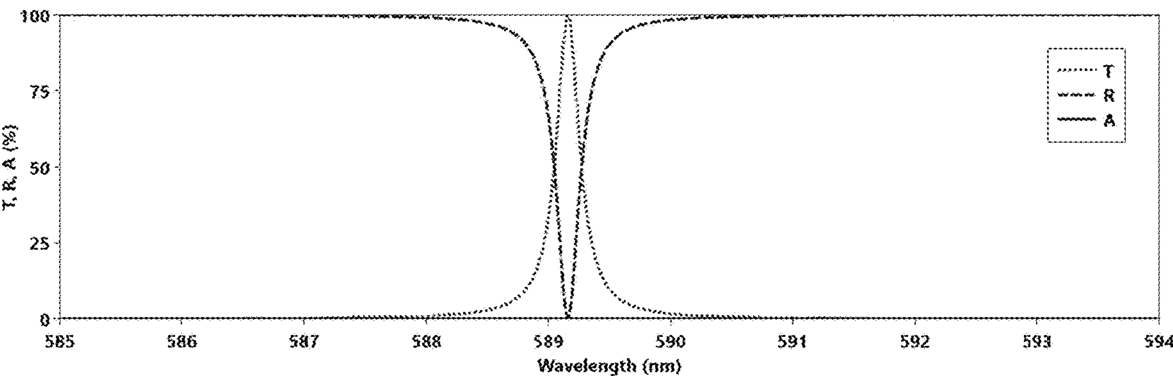
FIG. 1. Narrowband pass filter showing the spectral response and the refractive index structure of multilayer coating that produces the spectral response. This is prior art. It is a well-known structure, consisting of a spacer layer surrounded by reflecting stacks. Note that this filter reflects everywhere except for a narrowband pass region, where it transmits.
Figure 1:
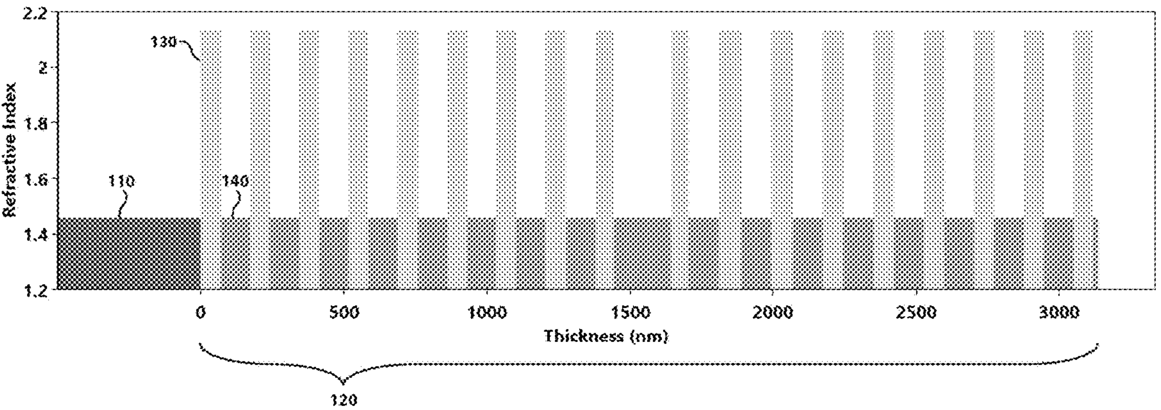

The design structure shown in FIG. 1 exemplifies the prior art of narrowband filtering. The narrowest bandwidths (full widths of a few nanometers to sub-nanometers) use the etalon-type configuration: a single spacer layer with a half-wave optical thickness surrounded by reflecting stacks composed of multiple quarter-wave thick layers. The multilayer stack consists of 2 materials with different refractive indexes. The multilayer stack 120 in FIG. 1 consists of alternating layers of low index 140 and high index 130 deposited on a transparent substrate 110.

The layer materials consist of standard optical materials, including dielectrics $SiO_2$ and $MgF_2$ for low-index materials for ultraviolet, visible, and near-infrared optical applications. Likewise, $Ta_2O_5$, $Nb_2O_5$, and $TiO_2$ are typical for the high-index materials for these spectral regions. The materials could include CaF2, PbF2, ZnS, ZnSe, Si, and Ge for mid-infrared and far-infrared spectral regions. However, the designs are not specific to the chosen layer materials, except to say that having a high index contrast between the low-index material and the high-index material is favorable. Materials commonly used in the thin-film community may be used in the filters of this invention.

Figure 2:
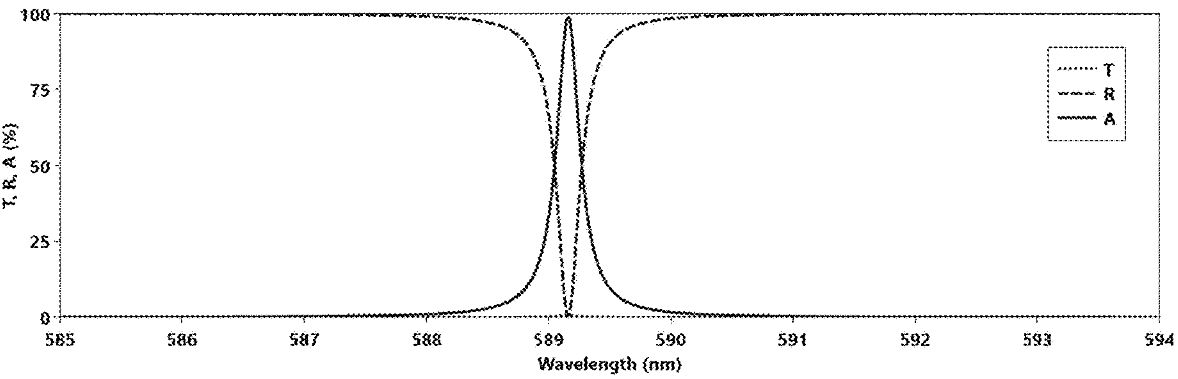
FIG. 2. Narrowband absorption filter showing the spectral response and the refractive index structure of multilayer coating that produces the spectral response. This filter reflects light over a wide wavelength region except for a narrowband region, where it absorbs. Notice there is one 10-nanometer absorbing layer. The filter illustrated in FIG. 2 represents a new class of optical interference filters: narrowband absorption filters.
Figure 2:
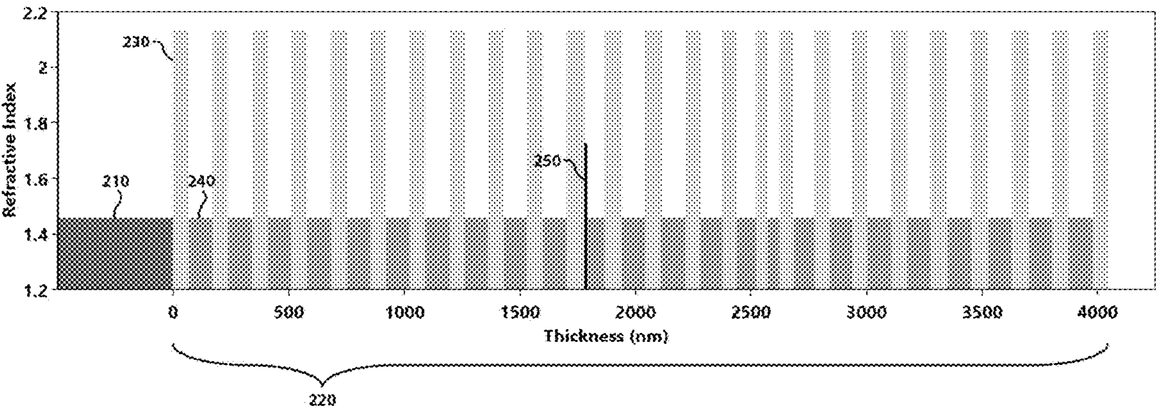

The thin-film layer configurations shown in FIG. 2 illustrate an embodiment of this invention's new type of narrowband filter called a narrowband absorber. The multilayer stack 220 in FIG. 2 consists of alternating low index 240 and high index 230 layers deposited on substrate 210. Note that this design includes a thin absorbing layer 250. The spectral plot in FIG. 2 indicates that reflection occurs over a wideband wavelength band, except for a narrowband region where it is absorbed.

Figure 3:
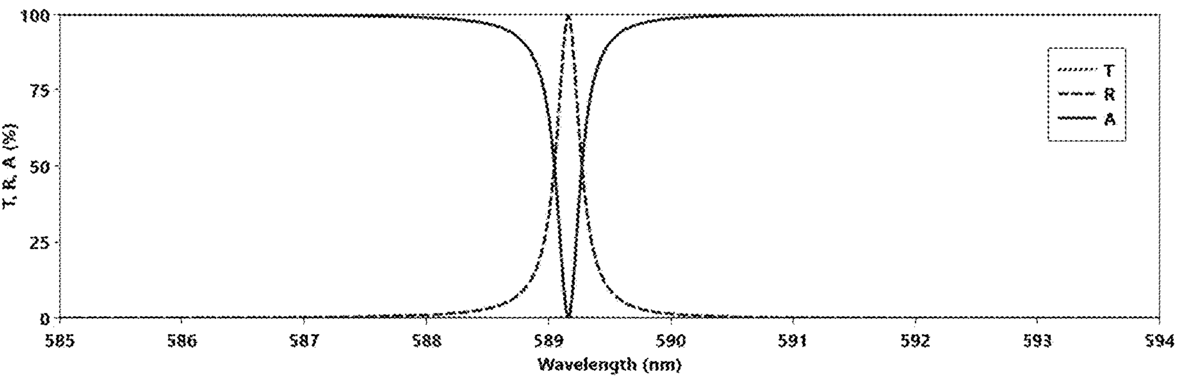
FIG. 3. Narrowband reflection filter showing the spectral response and the refractive index structure of multilayer coating that produces the spectral response. Incident light is absorbed over a wide wavelength region, except in a narrowband region where it is reflected. Notice there is one 10-nanometer absorbing layer. It is remarkable that one single absorbing layer can absorb such a wide spectral region and provide a narrow high reflection notch. This represents a new class of optical interference filters: narrowband reflection filters with wideband absorption.
Figure 3:
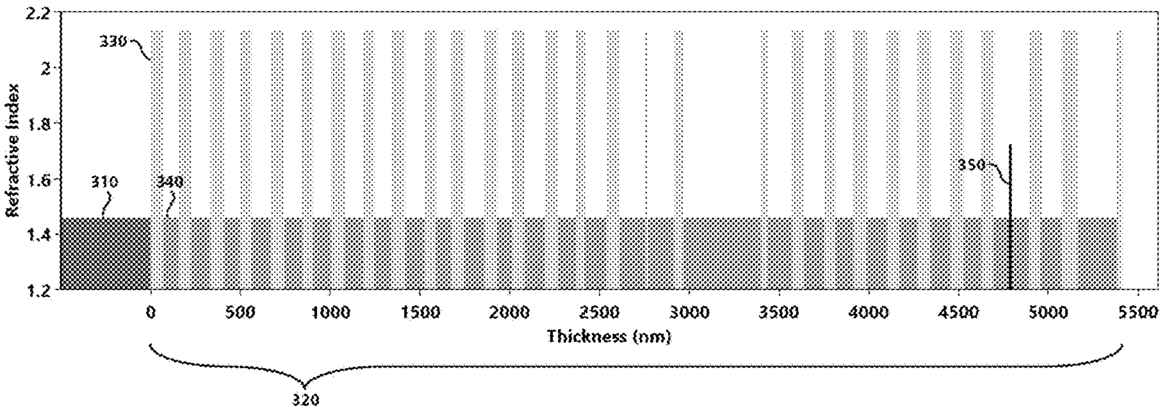

The thin-film layer configurations shown in FIG. 3 illustrate an embodiment of this invention's new type of narrowband filter called a narrowband reflector. The multilayer stack 320 in FIG. 3 consists of alternating low index 340 and high index 330 layers deposited on substrate 310. Note that this design includes a thin absorbing layer 350. The spectral plot in FIG. 3 indicates that absorption occurs over a wideband wavelength band, except for a narrowband region where it is reflected.

The absorbing layer material for these two new filter types is chosen from the metals Ta, Nb, Ag, Al, and Au, among others. The selection of the absorbing material is likewise not sensitive to a particular metal chosen, except to say that it is important to know the refractive index and extinction coefficient of the absorbing layers in the design stage. Some metals form islands when deposited as very thin layers. In that case, the refractive index and extinction coefficients differ from that of bulk value. Many metals achieve bulk properties for thicknesses of 20 nanometers and thicker. The island structure of some metals will coalesce to form a consistent homogeneous layer at 10 nanometers but not yet reach bulk values. In that case, refractive index and extinction coefficient measurements should be made when designing coatings using those materials.

Metals are used in the current art of optical coatings. For instance, they are used as wideband reflectors. Another type of filter that uses metals are induced-transmittance filters. These are discussed in the Macleod book previously mentioned. Induced-transmittance filters are also cavity-like configurations, except that the spacer layer is a dielectric, and the metal layers on each side of the spacer layer are metal layers producing the reflectors. The metal layers in these configurations are not thin (say of the order of 10 nanometers). The throughput of these filters is not high (which we consider as being up to or over 95%), and the bandwidths are generally not sharp or narrow (defined as a few nanometers down to one nanometer or less).

The induced transmission filters that use absorbing materials are like the prior art of FIG. 1 in that they are transmission filters. They do not describe nor anticipate narrowband absorption or narrowband reflection.

How the Invention is Made

The layer thickness distribution in these optical coatings is typically determined by Least Squares optimization of merit functions specifying the bandwidth and peak throughput. Such optimization may be accomplished with commercial optical coating design software. OptiLayer and TFCalc are two commercial software programs that can do such designs. The number of layers and their thickness are determined by iterative optimization using the design optical coating design software. These design procedures are well-known to those who practice the art of thin-film design.

The multiple-layer interference coatings used in this invention are typical of any multilayer interference coating consisting of alternating layers of standard low- and high-refractive index materials on common substrates. Commercial coating companies readily accomplish fabrication of the coatings. Viavi Solutions, Inc. and LohnStar Optics, Inc. are examples of two coating companies. These companies and others are skilled in fabricating optical coatings with specified layer thicknesses.

The deposition of the layers is typically done with magnetron sputtering, electron beam evaporation, or ion beam sputtering. The fabrication of the designs of this invention imposes no particular constraints for those skilled in thin-film technology.

Obvious Extensions

Those skilled in the art will identify obvious extensions. A few are named here.

1. Although examples herein include a single thin absorbing layer of 10 nanometers, designs may be constructed using more than one absorbing layer.
2. Thicknesses of the absorbing material are not restricted to 10 nanometers.
3. The position of the thin absorbing layer in the stack may differ from the example embodiments shown in the figures.
4. The substrate may be any optical material and need not be transparent.
5. Although the examples given here are for a single narrowband wavelength region, it is possible that multiple narrowband wavelength lines may be designed using the optimization techniques mentioned above.
6. The peak absorption or reflection in the embodiments is 99% or higher. However, filters can be designed with less throughput.
7. The bandwidths of the preferred embodiments given here are 1 nanometer or less. However, filters can be designed with wider bandwidths.

The invention claimed is:

1. A narrowband optical interference filter consisting of layers of low- and high-index dielectric materials and a single absorbing layer that is 10 nm thick on an optical substrate comprising a specified number of layers with specified layer thicknesses that reflects light except for a narrowband region where it is absorbed with a near 100% peak absorption and a full width at half max of 0.5 nm.

2. A narrowband optical interference filter consisting of layers of low- and high-index dielectric materials with one or more metal layers on an optical substrate comprising a specified number of layers with specified layer thicknesses that absorbs light except for a narrowband region where it is reflected.

* * * * *